United States Patent
Vilzmann et al.

(10) Patent No.: US 7,848,706 B2
(45) Date of Patent: Dec. 7, 2010

(54) RECEIVER AND TRANSMITTER FOR A NETWORK HAVING A NON-CENTRALIZED MEDIUM ACCESS CONTROL

(75) Inventors: Robert Vilzmann, Munich (DE); Christian Bettstetter, Klagenfurt (AT); Christian Hartmann, Munich (DE); Gerhard Bauch, Munich (DE); Katsutoshi Kusume, Munich (DE)

(73) Assignee: NTT DoCoMo, Inc., Tokyo (JP)

(*) Notice: Subject to any disclaimer, the term of this patent is extended or adjusted under 35 U.S.C. 154(b) by 697 days.

(21) Appl. No.: 11/895,988

(22) Filed: Aug. 27, 2007

(65) Prior Publication Data

US 2008/0039046 A1 Feb. 14, 2008

Related U.S. Application Data

(63) Continuation of application No. PCT/EP2005/002021, filed on Feb. 25, 2005.

(51) Int. Cl.
*H04B 1/00* (2006.01)
*H04B 15/00* (2006.01)

(52) U.S. Cl. ............... 455/63.1; 455/67.11; 455/67.13; 455/69; 455/562.1; 455/412.1; 455/277.1; 370/335; 370/445; 375/267; 375/325; 375/346; 375/348

(58) Field of Classification Search .............. 455/63.1, 455/67.11, 67.13, 69, 562.1, 412.1, 456.2, 455/277.1; 375/267, 325, 346, 348; 370/335, 370/445

See application file for complete search history.

(56) References Cited

U.S. PATENT DOCUMENTS 7,099,678 B2* 8/2006 Vaidyanathan .............. 455/500
7,352,730 B2* 4/2008 Ghosh et al. ................ 370/338
7,392,031 B2* 6/2008 Van Houtum ............... 455/304
7,486,726 B2* 2/2009 Alexander et al. ........... 375/232

(Continued)

FOREIGN PATENT DOCUMENTS

EP 1 156 689 A1 11/2001

(Continued)

OTHER PUBLICATIONS

International Search Report mailed Oct. 7, 2005.

(Continued)

*Primary Examiner*—Marceau Milord
(74) *Attorney, Agent, or Firm*—Nutter McClennen & Fish LLP; John J. Penny, Jr.

(57) ABSTRACT

A receiver includes a receiving unit for scanning a dedicated signaling channel for the presence of an announcement signal. The announcement signal indicates a transmitter willing to access a transmission medium. The receiving unit is further operative to receive a data signal from a further transmitter on a dedicated traffic channel. Furthermore, the receiver includes an interference estimator for estimating, whether an interference caused by a new transmitter is allowable or not. A processor is provided for applying an interference countermeasure, when the interference is not allowable. A transmitter can, without any limitation, transmit the announcement signal. The transmitter will start transmitting, when it receives a ready-to-receive signal from the addressed receiver and when it does not receive an objection tone from another receiver in the network.

32 Claims, 14 Drawing Sheets

U.S. PATENT DOCUMENTS

| | | | |
|---|---|---|---|
| 7,522,552 B2 * | 4/2009 | Fein et al. | 370/328 |
| 7,570,921 B2 * | 8/2009 | Sugar et al. | 455/63.4 |
| 7,573,945 B2 * | 8/2009 | Tesfai et al. | 375/267 |
| 7,646,744 B2 * | 1/2010 | Li | 370/328 |
| 2005/0138199 A1 * | 6/2005 | Li et al. | 709/236 |
| 2005/0141459 A1 * | 6/2005 | Li et al. | 370/334 |
| 2006/0040675 A1 | 2/2006 | Halfmann et al. | |
| 2006/0072524 A1 * | 4/2006 | Perahia et al. | 370/338 |

FOREIGN PATENT DOCUMENTS

| | | |
|---|---|---|
| EP | 1 389 884 A1 | 2/2004 |
| WO | WO-03/069937 A1 | 8/2003 |

OTHER PUBLICATIONS

International Preliminary Examination Report mailed Feb. 9, 2007.

* cited by examiner

Channels:

A is "deaf" with respect to C transmission reception

A is "deaf" with respect to C transmission
reception

- TCH
  DATA: high data rate payload signal

- SCH$_{in}$
  ANN:
  RTR, ACK: signal containing the adressee
  short anonymous (spread) signals containing no further data

- SCH$_{out}$
  OBJ, DFN: short anonymous signals, e.g. tones

FIG. 10b

RECEIVER AND TRANSMITTER FOR A NETWORK HAVING A NON-CENTRALIZED MEDIUM ACCESS CONTROL

CROSS-REFERENCE TO RELATED APPLICATIONS

This application is a continuation of copending International Application No. PCT/EP2005/002021, filed Feb. 25, 2005, which designated the United States.

TECHNICAL FIELD

The present invention is in the field of data transmission over communication networks, and in particular, in the field of medium access control.

BACKGROUND

In wireless networks, multiple devices typically share the same transmission medium or channel. This leads to the problem of medium access: If two or more devices access the shared medium at the same time, their transmissions will interfere with each other, leading to collisions and reduced system performance. The role of medium access control (MAC) is to moderate the access to the shared medium by defining rules that enable the devices to communicate with each other in an orderly and efficient manner. MAC protocols play an important role in ensuring efficient and fair sharing of the scarce wireless bandwidth.

One can broadly categorize MAC protocols into two types: centralized and distributed schemes. In infrastructure-based mobile networks, e.g. in GSM and UMTS, the medium access is typically controlled in a centralized manner. Dedicated network entities, such as base stations, allocate time slots or codes to mobile devices thus avoiding collisions.

In infrastructure-less mobile networks, so called ad hoc networks, the MAC must be performed in a distributed manner. The mobile nodes have to minimize collisions without global knowledge about the network. Current MAC approaches for ad hoc networks are usually based on the IEEE 802.11 standard for wireless local area networks (WLANs) which employs a distributed coordination function (DCF) that is based on a carrier sense multiple access with collision avoidance (CSMA/CA) mechanism. The DCF includes two phases: (a) carrier sensing at the transmitter and (b) exchange of coordination information. The latter is performed by transmitting a request-to-send (RTS) message by the transmitter and a clear-to-end (CTS) message by the receiver in response to the RTS message. Neighboring nodes that overhear one or both messages have to abstain from transmission for the time period as indicated by the messages. This ensures the omni-directional spatial reservation of the shared medium around the transmitting and the receiving node of a communicating node pair.

In ad hoc networks, mobile devices communicate with each other in a peer-to-peer fashion; they establish a self-organizing wireless network without the need for base stations or any other pre-existing network infrastructure. If two devices cannot establish a direct wireless link (because they are too far away from each other), devices in between will act as relays to forward the data from the source to the destination. In other words, mobile devices can simultaneously act as data sources, data sinks, and intermediate forwarding devices. The mobile devices are referred to as "nodes".

Neighboring nodes are silenced irrespective of whether or not they disturb signal reception. Reserving the channel in the area around the transmitter-receiver node is particularly suboptimal when beamforming antennas are deployed.

Beamforming is a technique that can be performed by so-called "smart" antennas, which consist of a plurality of antenna elements. With these elements, the mobile device can electrically form "beams" into advantageous directions instead of radiating the transmission power equally, i.e. in an essentially omni-directional manner. Depending on their capabilities, such antenna systems are referred to as "switched beam" antennas or "adaptive" antennas or phased array antennas. The term "beamforming pattern" refers to the entire direction-dependent antenna gain characteristic. Due to the limited number of antenna elements and the complexity involved, not the entire beamforming pattern can be controlled. Instead, there is usually an intended main beam, i.e., a sector with increased antenna gain, and several more or less unintentional side beams. This direction-dependent adjustment of the antenna gain can be performed both for transmission and for reception.

The present MAC protocols for ad hoc networks are not suitable when using beamforming antennas. The reasons are twofold. First, beamforming antennas potentially provide advantages over omni-directional antennas that cannot be exploited by present MAC protocols. Second, the use of present MAC protocols leads to side effects when beamforming antennas are deployed, which degrade the effectiveness and performance of the protocol.

The major advantage of using beamforming antennas in ad hoc networks is the potential for increasing the spatial reuse of the scarce radio resources. This potential resides in the fact that the signal-to-noise ratio (SNR), which is critical for effective data transmission, can be increased by forming beams in advantageous directions, while suppressing interference from other directions. Thus, a higher number of concurrent transmissions in some given area can be expected as compared to the case when omni-directional antennas are used.

If only the payload data is transmitted and/or received directionally, while the neighborhood of the receiver and the transmitter is still blocked as it is done with the IEEE 802.11 DCF, the MAC protocol will not exploit this potential benefit of beamforming antennas.

If, however, the before mentioned RTS and CTS messages are sent directionally, severe side effects are likely to happen. In this case, there may be nodes that are located within the transmission range of a currently receiving node, but they may not have received the RTS nor the CTS packed. These "hidden" nodes may then start a transmission, which may cause interference at said receiving node resulting in packet losses. Such situations are referred to as "hidden terminal" problems.

In general one can say that there is a tradeoff between spatial reuse and collisions (of control and/or data packets). The higher the spatial reuse is, i.e., the closer simultaneous transmissions sharing the same physical channel are, the higher is the number of hidden terminals and the probability of collisions.

A second major problem with beamforming antennas is known as "deafness". It is assumed that there is a first node and a second node. It is further assumed that the first node wants to set up a communication with the second node. If the beamforming pattern of the second node is such that it suppresses the incident power from the direction of the first node, it will be "deaf" with respect to the first node.

For avoiding collisions, some known solutions propose an explicit distribution of collision avoidance information. With some solutions, a rather extensive amount of information is maintained that allows nodes to decide whether or not is it safe to transmit in a certain direction. The necessary information is usually included in control packets.

Another known solution deals with the tradeoff between spatial reuse and hidden terminals by directional transmission of RTS packets and omni-directional transmission of CTS packets.

Other known solutions use omni-directional tones together with directional control packets.

Further, there are solutions comprising a contention resolution phase, where transmission time slots are claimed, and a subsequent data transmission phase. However, such approaches necessitate synchronized mobile terminals.

For dealing with deafness, a known solution proposes to transmit tones upon packed transmission. These tones shall indicate to neighboring nodes that a deafness situation may have (possibly) occurred.

In the final conclusion the above makes clear that for beamforming situations as well as for non-beamforming situations existing networks are too restrictive and, thus, do not fully utilize the scarce transmission medium or are very complicated and, therefore, buy the optimum utilization for a high prize.

SUMMARY

According to an embodiment, a receiver for a network having a non-centralized medium access control may have: a receiving unit for scanning a dedicated signaling channel for the presence of an announcement signal, the announcement signal indicating a transmitter willing to access the transmission medium, and for receiving a data signal from a further transmitter on a dedicated traffic channel; an interference estimator for estimating, whether an interference on the traffic channel caused by a potential medium access of the transmitter transmitting the announcement signal is allowable or not; and a processor for applying an interference counter-measure, when the interference is not allowable.

According to another embodiment, a transmitter for a network having a non-centralized medium access control may have: a transmitting unit for transmitting an announcement signal on a dedicated signaling channel, the announcement signal indicating that the transmitter is willing to access the transmission medium and to communicate with an addressed receiver; a receiving unit for listening for an objection signal from a non-addressed receiver; and a processor for controlling the transmission unit to start transmitting a data signal on a dedicated data channel only when no objection signal has been received.

According to another embodiment, a method of receiving in a network having a non-centralized medium access control may have the steps of: scanning a dedicated signaling channel for the presence of an announcement signal, the announcement signal indicating a transmitter willing to access the transmission medium; receiving a data signal from a further transmitter on a dedicated traffic channel; estimating, whether an interference on the traffic channel caused by a potential medium access of the transmitter transmitting the announcement signal is allowable or not; and applying an interference counter-measure, when the interference is not allowable.

According to another embodiment, a method of transmitting in a network having a non-centralized medium access control may have the steps of: transmitting an announcement signal on a dedicated signaling channel, the announcement signal indicating that the transmitter is willing to access the transmission medium and to communicate with an addressed receiver; listening for an objection signal from a non-addressed receiver; and starting a transmission of a data signal on a dedicated data channel only when no objection signal has been received.

Another embodiment may have: a computer program for performing the above method of receiving or the above method of transmitting, when the program runs on a computer.

The present invention is based on the finding that an efficient medium access control is obtained in that a transmitter wishing to start transmission via the transmission medium indicates its wish by transmitting an announcement signal without any limitation. This announcement signal is positioned in a dedicated signaling channel so that occurring transmissions are not disturbed by the traffic on the different signaling channel. When the receiver receives a ready-to-receive signal from an intended receiver, which ready-to-receive signal is also transmitted within a dedicated signaling channel, and when the transmitter does not receive any objection from any other receiver, the transmitter can start transmission. Thus, the participants in the network having a non-centralized medium access control negotiate their access control between each other without a centralized authority. It is noted that the ready-to-receive signal is not mandatory, since, alternatively, the transmitter could also wait a certain time period controlled by a timer until transmission starts without receiving a ready-to-receive signal. Alternative possibilities exist which are based on avoiding transmissions when there is an objection signal or allowing transmission when there is no objection signal.

On the receiver-side, the only problem can arise with an already communicating receiver, which is not addressed by the new transmitter, i.e., the transmitter sending the announcement signal. In accordance with the present invention, this receiver, which is already receiving from a further transmitter continuously scans the dedicated signaling channel for upcoming announcement signals. This continuous scan of the dedicated signaling channel for announcement signals takes place in parallel to a normal reception of data via another dedicated traffic channel. When the receiver detects an announcement signal, it has to perform an interference estimation to find out, whether an interference on the traffic channel caused by a potential medium access of the transmitter transmitting the announcement signal is allowable or not. When the receiver recognizes that the new transmitter will not interfere its communication with the already transmitting transmitter, nothing has to be done anymore. In accordance with the present invention, the receiver simply stays silent and ignores the announcement signal.

When the receiver, however, estimates that the new transmitter would result in a non-allowable interference, the receiver will apply an interference counter-measure so that the new transmitter will not result in any problems with already existing transmitters/receiver-pairs.

In an embodiment of the present invention, the ultimate goal of the ad-hoc network is that as many transmitters as possible can participate. Thus, the receiver applying interference counter-measures will send an objection tone only in a situation, in which the receiver has not determined any other useful counter-measure. Thus, the already communicating receiver has the possibility and, in fact, the power to deny the new transmitter.

Advantageously, however, denying the new transmitter is only the last choice. Other counter-measures, which, in certain situations will not result in denying the new transmitter, include the usage of a multi-user detecting scheme based on information on the transmitter or the further transmitter.

Alternatively, the receiver can apply an interference cancellation scheme to reduce the interference caused by the new transmitter.

Alternatively, the receiver can apply, as another counter-measure, a certain beamforming for nulling out the new transmitter transmitting the announcement signal. As known in the art of beamforming, the phased antenna array of the receiver can be controlled such that the new transmitter is positioned within a section of minimum antenna gain so that the new transmitter will not disturb the communication between the receiver and the already existing transmitter. Naturally, such beamforming has to be performed carefully so that the communication between the receiver and the already transmitting transmitter is not disturbed too much.

Another possibility for a counter-measure, which will not result in denying the new transmitter, includes a negotiation of the receiver with the already transmitting transmitter so that the already transmitting transmitter increases its transmission robustness such as by adding a higher redundancy.

Another potential counter-measure can even be that the already receiving receiver starts a negotiation with the new transmitter so that the new transmitter reduces its transmission power etc.

Advantageously, the dedicated signaling channel for the announcement signal is an in-band channel, i.e., uses the same frequency band as the traffic channel. In addition to the announcement signal, it is also advantageous to transmit a ready-to-receive signal as well as an acknowledgement signal (discussed later), and which is transmitted by a receiver, when the receiver has received all data from a transmitter, within the dedicated in-band signaling channel, too.

In a further signaling channel, which is advantageously an out-of-band signaling channel, the objection signal as well as a deafness signal, which will be discussed later on are sent.

As outlined above, the announcement signal is advantageously transmitted within the same communication channel, i.e., the frequency band, which is used for data transmission. Since the announcement signal and the other data signals superimpose within the communication channel, the announcement signal may be encoded using an encoding scheme enabling signal separation. For example, the announcement signal may be orthogonalized with respect to other signals within the communication channel so that neither the announcement signal nor the data signal is disturbed.

However, since the announcement signal is transmitted within the same communication channel, which is in use, an impact of the network entity being about to access the communication channel can a priori be determined on the basis of the received announcement channel. Hence, other network entities, for example other receivers transmitting within the communication channel, can extract the announcement signal from a signal received within the communication channel, and can decide whether additional interference, which is introduced when the new transmitter additionally transmits within the communication channel, is tolerable or not tolerable.

If the communication channel is determined by a multiple access scheme, for example by a CDMA scheme, then the announcement signal is advantageously coded using the CDMA scheme which is to be used when transmitting data in order to emulate the real transmission scenario.

Advantageously, a network entity necessitating access to the communication channel of the communication network may transmit at any time, even then when other network entities are transmitting or receiving signals within the communication channel.

As mentioned above, the inventive concept can also be applied by communication systems applying beamforming techniques for transmission and/or reception. In this context, the inventive approach will be referred to using the term "BeamMAC".

The name BeamMAC shall indicate the suitability of the approach for antenna systems with antenna gain patterns achieved by beamforming techniques. However, BeamMAC also works with omni-directional antennas. Moreover, it can be applied in heterogeneous scenarios with both directional and omni-directional antennas.

BeamMAC differs from this classical MAC approach in a way that the area around two nodes is not explicitly reserved for their communication. Of course, the object of the protocol is still the restriction of channel access. The key contribution of the BeamMAC approach lies in the limitation of interference at receiving nodes while allowing maximum node access without complicated node synchronization or complicated conflict resolution protocols.

The present invention provides a solution for trading off spatial reuse and hidden terminals. Collisions can be avoided while allowing for acceptable interference levels. The approach works without synchronization of mobile devices, which is of great benefit in ad hoc networks. As compared to previous approaches, a MAC protocol according to the invention does not necessitate the explicit exchange of a large amount of collision avoidance information and thus reduces the protocol overhead.

In summary, the invention provides a key building block in enabling ad hoc networks with beamforming or non-beamforming antennas. This provides the following general benefits:

More efficient use of scarce radio resources, by improved spatial reuse compared to 802.11.

Improved Quality of Service (e.g. multimedia applications), by improved fairness which leads to lower delay jitter.

Better connectivity of mobile devices, by enabling links beyond the omni-directional transmission range

BRIEF DESCRIPTION OF THE DRAWINGS

Embodiments of the present invention will be detailed subsequently referring to the appended drawings, in which:

FIG. 10b is an overview over channels, messages and tones in accordance with an embodiment of the present invention;

DETAILED DESCRIPTION

Figure 1:
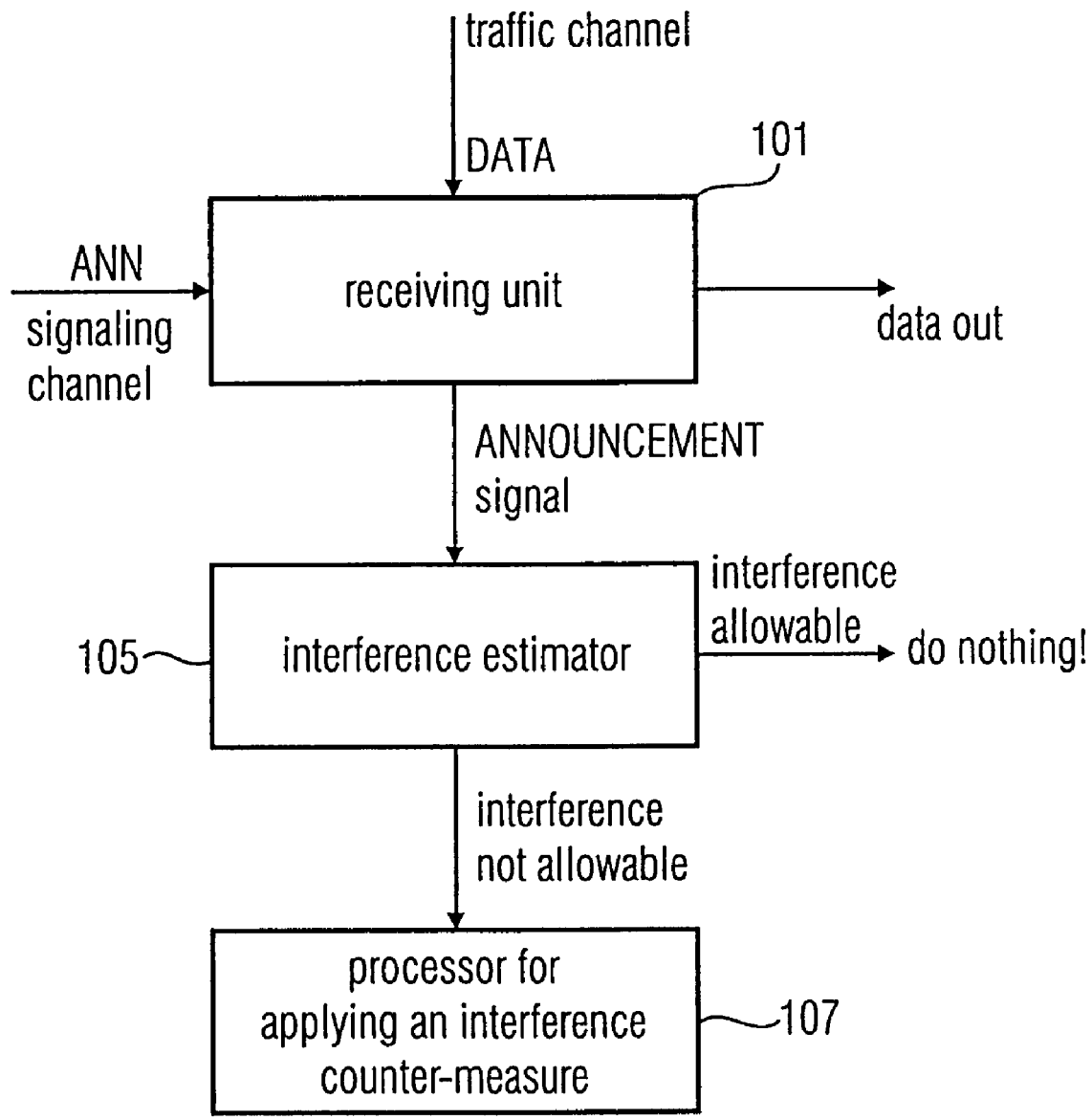
FIG. 1 is a block diagram of a receiver according to the present invention.
Figure 2:
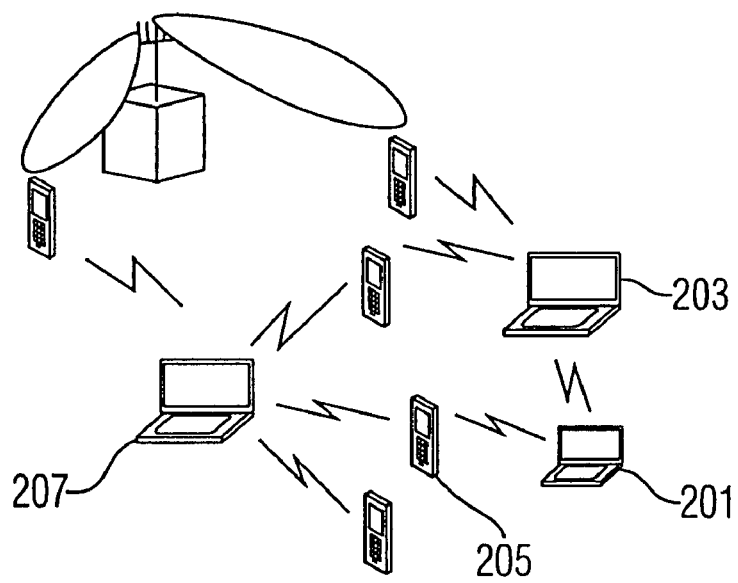
FIG. 2 is an embodiment of the inventive network scenario.

FIG. 1 demonstrates an embodiment of an inventive receiver for a network having an non-centralized medium access control such as in an ad-hoc network shown in FIG. 2.

In particular, the inventive receiver includes a receiving unit 101 for scanning a dedicated signaling channel for the presence of an announcement signal (ANN), the announcement signal indicating a transmitter willing to access the transmission medium, and for receiving a data signal from a further transmitter on a dedicated traffic channel. The receiving unit 101 is operative to process a traffic channel such that the data transmitted on the traffic channel are output at a data out terminal. Another output of the receiving unit 101 is coupled to an interference estimator. In accordance with the present invention, the interference estimator is operative to estimate, whether an interference on the traffic channel caused by a potential medium access of the transmitter transmitting the announcement signal is allowable (e.g. tolerable or non-corruptive) or not. When the interference estimator determines that the interference caused by the new transmitter is allowable, then nothing will be done with respect to the new transmitter. When, however, the interference estimator 105 determines that the interference is not allowable, a processor 107 for applying an interference counter-measure is activated.

In accordance with the present invention, the interference counter-measure may be the issuance of an objection tone. However, in accordance with an embodiment of the present invention, this "hard" measure is only regarded as the last possibility, when all other "more softer" possibilities have been failed to resolve an interference problem.

Advantageously, the announcement signal is encoded using an encoding scheme in order to enable extracting the announcement signal from a superposition of the data signal and the announcement signal. For example, the announcement signal is encoded using a CDMA scheme, which is reserved for transmitting announcement of control signals. However, the announcement signal can be encoded using an orthogonal sequence, which is orthogonal with respect to data transmitted by the further transmitter so that, at the receiver, the announcement signal can be extracted using for example a corresponding orthogonal sequence.

Alternatively, the dedicated signaling channel for transmitting the announcement signal need not necessarily be an in-band channel. Although this embodiment is advantageous, since it allows a very accurate and efficient interference estimation, since the dedicated signaling channel "simulates" the actual traffic channel, other embodiments can also be useful in certain situations. Thus, transmitting the announcement signal in a dedicated signaling channel, which is out of the traffic channel band, but which is close by the traffic channel band will also result in a good possibility to use the announcement signal for interference estimation to a satisfying degree.

Alternatively, the out-of-band signaling channel for the announcement signal can be positioned farther away from the traffic channel. In this case, interference estimation based on the announcement signal will lose accuracy. Nevertheless, there are situations for networks having a quite flat channel response of the transmission medium, in which this disadvantage can be compensated using additional channel information, which might be predetermined or adaptively determined using certain dedicated channel estimators etc.

Finally, the interference estimation can be completely based on separately retrieved channel information, so that the interference estimation is completely conducted without any power or energy information of the received announcement signal. In this case, for example, the announcement signal can only be used for detecting a direction of incidence of a transmission signal from the transmitter transmitting the announcement signal, while a channel information for a channel from this direction to the addressed receiver can be retrieved from another information source. Nevertheless, it is advantageous to use the announcement signal for interference estimation so that it is advantageous to place the dedicated signaling channel and the traffic channel with respect to each other such that channel characteristics of the signaling channel depend on channel characteristics of the traffic channel or vice-versa.

The inventive receiver may be employed within a communication scenario shown in FIG. 2.

For example, the inventive receiver 201 is receiving data signals from the further transmitter 203. Simultaneously, a further transmitter 205 necessitates channel access for transmitting data to e.g. another receiver 207. Prior to accessing the channel, the transmitter 205 transmits the announcement signal within the communication channel in order to "simulate" the subsequent data transmission.

The inventive approach may advantageously be employed within the context of a beamforming scenario, wherein adaptive, beamforming antennas are employed for transmitting or receiving. This approach is expected to result in a significant capacity gain in ad-hoc networks, a lower power consumption of the mobile nodes in the networks, which is reflected by a longer battery lifetime, and reduced emissions. Furthermore, better coverage/connectivity and improved security can be obtained.

The present invention solves problems associated with the known scenarios depicted in FIG. 3.

Figure 3A:
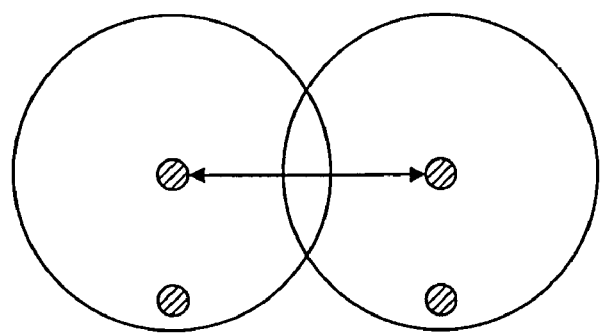
FIG. 3a demonstrates a known situation, in which collision avoidance is obtained by reserving an area around communicating nodes.

For example, FIG. 3a demonstrates the omni-directional case, where collisions are avoided by reserving an area around communicating nodes. Hence, other nodes are not enabled for communicating within the reserved area (although they might be non-problematic), which reduces an overall data throughput to smaller degree than might be possible.

Figure 3C:
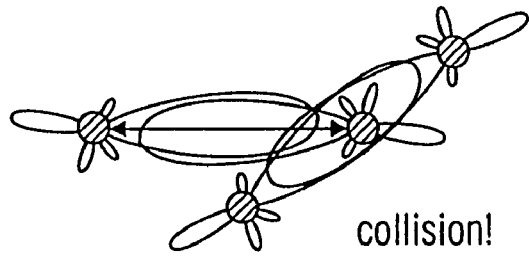
FIG. 3c illustrates a collision situation within the beamforming case shown in FIG. 3b.
Figure 3B:
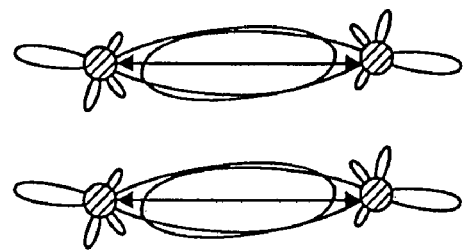
FIG. 3b illustrates a general beamforming situation.

FIG. 3b demonstrates the known beamforming case, where associated nodes communicate with each other using directional transmitting and receiving patterns. Although an increased capacity and throughput can be achieved, collisions are possible as depicted in FIG. 3c.

Figure 4A:
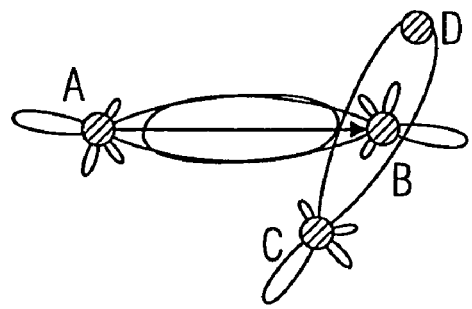
FIG. 4a indicates a situation, in which node C transmits an announcement message during an ongoing transmission between node A and node B, and node C receives an objection tone from node B.
Figure 4B:
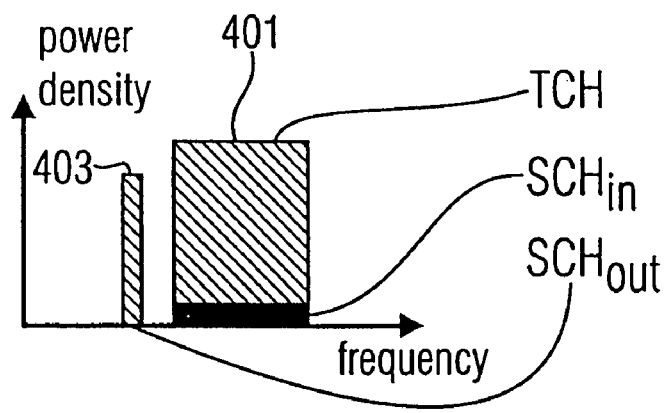
FIG. 4b is an overview over the channel distribution including the traffic channel, the in-band signaling channel and the out-of-band signaling channel.

An example of the inventive collision avoidance is demonstrated in FIG. 4a. An embodiment of the advantageous channel set up is given in FIG. 4b. In FIG. 4a, node C transmits an announcement message (ANN) on $SCH_{in}$, i.e. within the communication channel 401. According to the present invention, node C transmits with the same beamforming pattern that will be used for actual data transmission. Node B receives the announcement message with an excessive high power level and, thus, sends an objection signal (objection tone, OBJ) on the channel $SCH_{out}$, i.e. within the further communication channel 403 a the ultimate counter-measure. As is depicted in FIG. 4b, the communication channel 401 having the traffic channel and the dedicated signaling channel for the ANN signal and the further communication channel 403 are separated in frequency, by way of example only. Node C receives OBJ and thus does not transmit data.

Figure 5:
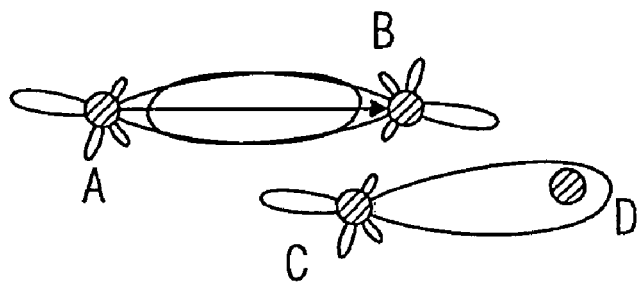
FIG. 5 is a situation, in which node C transmits an announcement signal and no objection is issued.

A successful transmission scenario is demonstrated in FIG. 5. For example, B does not receive the announcement message (announcement signal) with significant power level when beamformed to A, i.e. when receiving from A, so that an additional interference can be neglected. However, node D which is addressed by node C may receive the announcement message, may estimate the direction of arrival, may find suitable beamforming for reception and may reply with e.g. a ready to receive (RTR) signal on $SCH_{in}$ to node C. This node subsequently transmits data to D. For example, node D may send an acknowledgement (ACK) signal on $SCH_{in}$ to C indicating a successful transmission. Thus, the prospective transmitters simulate a transmission on a signaling channel $SCH_{in}$ (the further communication channel) before accessing the traffic channel, i.e. the data channel (the communication channel). Adjacent nodes can estimate the interference level based on the received announcement message and object if the interference level is too high.

As mentioned above, the inventive concept may also be applied in the case of deafness detection.

Figure 6:
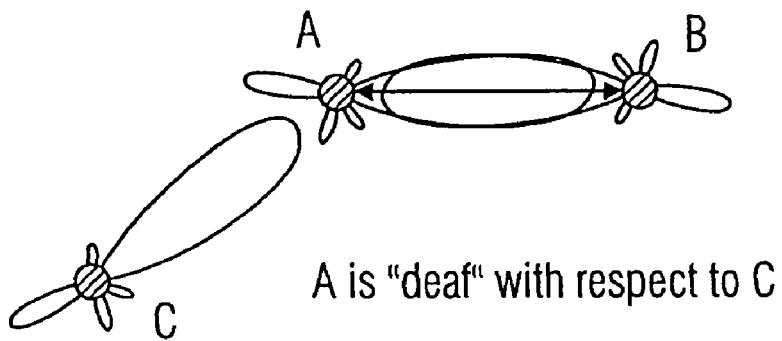
FIG. 6 is a situation, in which node A communicates with node B and node A is deaf with respect to node C.

As is depicted in FIG. 6, node C is about to transmit to node A during an ongoing transmission from node B to node A. However, as is depicted in FIG. 6, node A cannot receive anything from node C since it senses directionally to node B.

The communication standard 802.11 tries to solve the deafness problem by allowing node C to continuously try to contact node A, which leads to a useless signal transmission. However, since A remains beamformed to B, a back-off interval of node C gets larger and larger so that node B is likely to gain access again before node C, which results in unfairness against node C and packet droppings.

According to the present invention, each node may sense the signaling channel ($SCH_{in}$) that is used for announcing messages both directionally and omni-directionally. The directional and omni-directional mode can be achieved by switching in time or by using signal processing units allowing an efficient implementation. A node may, according to the present invention, detect its deafness when receiving a signal only omni-directionally but not directionally, as has been mentioned above. Upon deafness detection, a node can initiate various means for deafness resolution, e.g. sending a deafness tone etc. Advantageously, such a deafness tone is only issued, when the receiver is addressed by the transmitter transmitting the announcement signal.

It is to be noted that the ANN signal may include an ID of the intended receiver. However, other implementations include an anonymous ANN signal. In this case, the deafness signal should include an ID of the deaf receiver so that the "announcing" transmitter can find out, whether its intended partner is deaf or not.

Referring again to the embodiment of the receiver shown in FIG. 1, the receiving unit 101 may have a direction dependent direction characteristic which is determined e.g. by a beamforming pattern having a main reception beam (a main lobe) directed towards the further transmitter. So, the receiving unit 101 may be configured for forming a reception beam pattern.

The receiving unit 101 may comprise an antenna unit for data reception, which is configured for steering a reception characteristic of the antenna unit to obtain a reception beam pattern which has a main reception beam corresponding to a maximum antenna gain when receiving channel signals from a direction determined by the main reception beam, i.e. in order to capture the direction of arrival associated with the transmitter.

Moreover, the receiving unit 101 is configured for receiving signals being transmitted over the communication network within the communication channel. As has been mentioned above, a certain frequency band may determine the communication channel. In this case, the receiving unit may be configured for suppressing frequency components outside the certain frequency band in order to provide the channel signal occupying the certain frequency band. For example, the receiving unit 101 comprises a filter which has a characteristic formed to capture only the certain frequency band.

However, the communication channel may be determined by a certain CDMA scheme. In this case, the reception unit 101 may be configured for receiving the channel signal using information on the certain CDMA scheme, i.e. using an orthogonal sequence, which is related to an orthogonal sequence used by the CDMA scheme.

It is to be noted here that the receiving unit can continuously scan the dedicated signaling channel. However, it may also scan the signaling channel only at certain time instances, e.g. every 100 milliseconds, in order to obtain the announcement signal.

Figure 7:
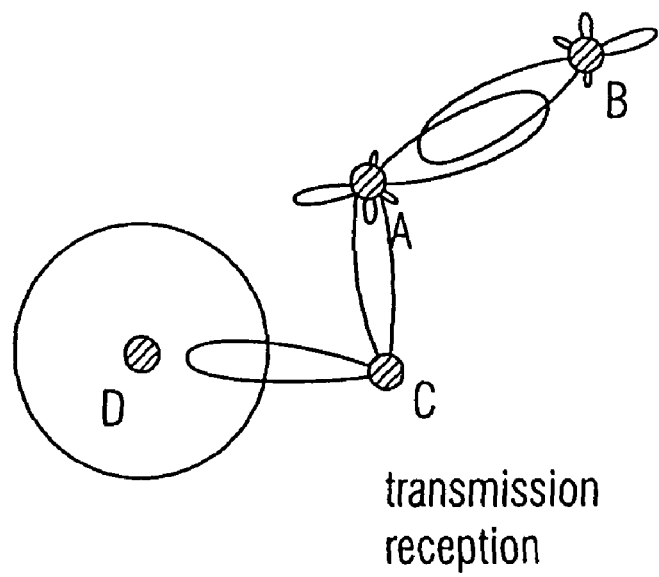
FIG. 7 indicates a problematic situation that can happen under the standard IEEE 802.11.

In the following, the hidden terminal problem is discussed with respect to FIG. 7. For example, node C is about to transmit to node D during an ongoing transmission from B to A. According to the 802.11 standard, C senses the channel and, therefore, does not hear any transmissions. C sends therefore a request to send (RTS) and node D sends clear to send (CTS). Then, C sends data traffic, which results in collisions at node A, so that packet losses occur.

Figure 8:
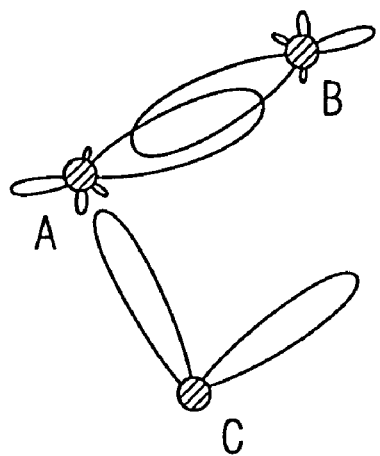
FIG. 8 demonstrates another problematic situation, which might result in an unfairness against node C.

The deafness scenario associated with beamforming is depicted in FIG. 8. As is demonstrated, node A cannot receive anything from C, since it senses directionally to B. Hence, C continuously tries to contact A which results in a useless signal transmission. However, since A remains beamformed to B, a back-off interval of node C gets larger and larger, so that B is likely to gain access before C, which results in unfairness and packet droppings as, mentioned above.

Referring again to FIG. 7, node C may transmit announcement message on $SCH_{in}$ with the same beamforming pattern in order to indicate that C is about to use the channel for data transmission. However, A does not receive the announcement signal (announcement message) with significant power level when beamformed to B. However, node D receives the announcement message, estimates direction of arrival, finds a suitable beamforming for reception and replies with e.g. a ready to receive (RTR) signal on $SCH_{in}$ to C. Then, node C transmits data to D, wherein D sends an acknowledgement (ACK) signal on $SCH_{in}$ to node C. Hence, the channel is successfully accessed.

For deafness detection, each node may, in accordance with the present invention, sense on $SCH_{in}$ both directionally and omni-directionally, wherein periodical switching or parallel signal processing may be employed. For example, referring again to FIG. 8, node A sends a deafness (DFN) tone on $SCH_{OUT}$ using omni-directional transmission. Node C receives DFN. However, node C does not transmit data but reduces its back-off interval. Therefore, a higher level of fairness and reduced signaling overhead may be achieved.

Figure 9A:
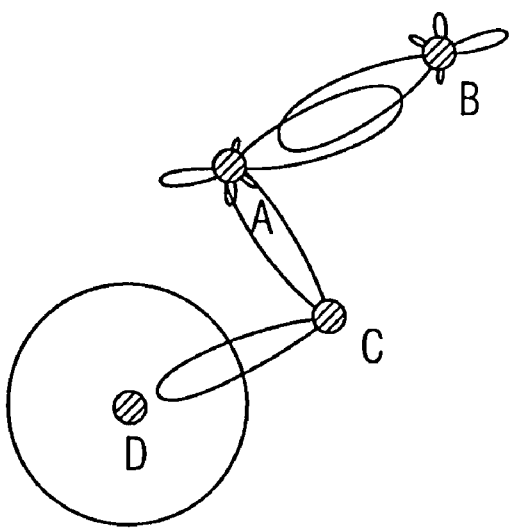
FIG. 9a is a successful channel access between node C and node D in accordance with the present invention.

FIG. 9a shows an inventive successful channel access scenario. In particular, FIG. 9a shows an ongoing transmission between node B and node A, wherein node A is the receiver. Node C wants to transmit to node D. In view of this, node C transmits an announcement (ANN) message on the signaling channel with the same beamforming pattern to be used for data transmission. Node A does not receive the announcement signal with significant power level, when beamformed to node B. Thus, node A does not have to apply any countermeasure. Node D receives the announcement signal, estimates the direction of arrival of this announcement signal, finds its suitable beamforming for reception and replies with a ready-to-receive (RTR) tone on the same signaling channel, on which the announcement signal has been issued. Then, node C transmits its data to node D, and node D sends a data receipt acknowledgement (ACK) tone to node C.

Figure 9B:
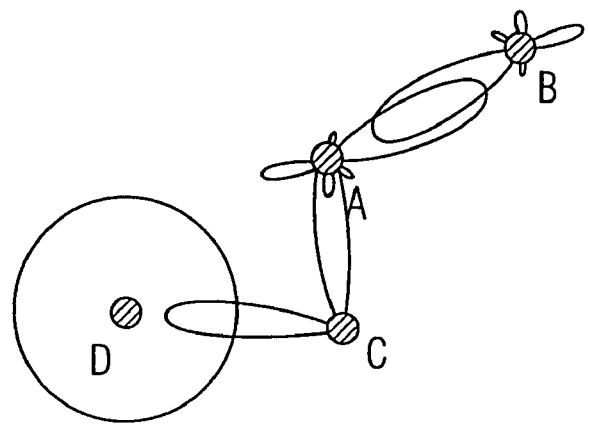
FIG. 9b is a collision avoidance scenario in accordance with the present invention, since node A sends an objection signal.

FIG. 9b shows an inventive collision avoidance scenario. Again, there is an ongoing transmission between node B and node A, where node A is the receiver. Again, node C wants to transmit to node D. In contrast to FIG. 9a, where the antenna gain diagram of node A was such that node C was in a low gain portion of the gain diagram, the situation is different in FIG. 9b, since node C is not "nulled-out". Thus, node A receives the announcement message with an excessive power level and, thus, sends an objection tone on the second signaling channel, i.e., the out-of-band signaling channel.

Node C receives this objection tone and, thus, does not transmit data. Alternatively, node A could have performed another "softer" counter-measure in order to allow transmission of node C. One such counter-measure would have been for node A to modify its antenna pattern so that the antenna pattern of receiver A has a zero or low gain portion directed to node C.

Figure 9C:
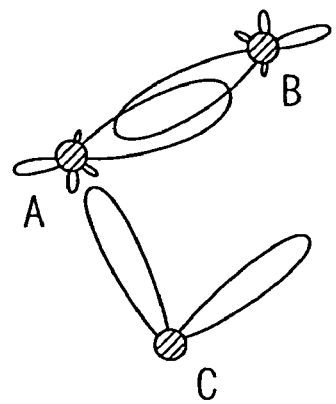
FIG. 9c is a problematic situation with respect to deafness, which might result in unfair treatment of node C.

FIG. 9c shows a deafness situation. Again, there is an ongoing transmission between B and A, and C wants to transmit to A. To this end, node C transmits an announcement message on the in-band signaling channel with the same beamforming pattern that it wants to use for data transmission. However, node A does not receive the announcement message, since node A is beamformed to node B. Thus, node A is "deaf" with respect to any transmitter being in the direction of node C and willing to come in touch with A.

Figure 9D:
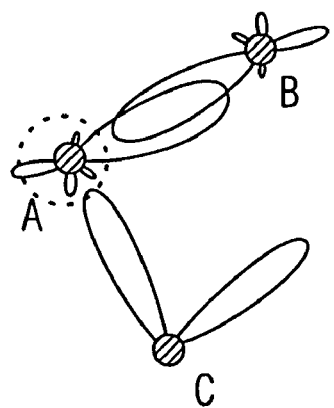
FIG. 9d is a deafness detection and resolution scenario in accordance with the present invention, which results in a fair treatment of node C.

For deafness detection, node A senses the signaling channel both directionally and omni-directionally (as indicated by the omni-directional antenna diagram in FIG. 9D, which is shown as a dotted line). Node A, then, detects its deafness because the announcement message is received omni-directionally and, because the announcement message indicates node A as the desired addressee, i.e., the destination.

For deafness resolution, node A sends a deafness tone advantageously on the out-of-band signaling channel using omni-directional transmission. Node C receives the deafness tone and, thus, does not transmit data, but reduces its back-off interval. Reducing the back-off interval results in the fact that node C again tries to come in contact with node A within a shorter period compared to a non-reduced back-off interval. Thus, node C is allowed to retry transmission in even shorter periods, the periods becoming shorter after each resolved deafness situation. This procedure has advantages of a higher level of fairness and a reduced signaling overhead, since node C does not continuously try to reach node A, which would be the case completely without any deafness resolution technique.

At this point, it is to be mentioned that the deafness tone is an anonymous tone. The fact that the deafness tone is an anonymous signal is, however, not problematic, since the deafness tone is only issued by a receiver, which is addressed in the announcement signal or an identification signal following the announcement signal.

The ANN signal advantageously contains the ID of the intended receiver. Thus, the receiver may proceed by beamforming toward the transmitter. According to the details of the inventive MAC protocol, the receiver further transmits a ready-to-receive (RTR) message, and subsequently is arranged to receive payload data. The RTR message may or may not include the ID of either the transmitter or the receiver. The RTR message may also be a mere indicative signal containing no data.

A prospective transmitter knowing the direction of its intended receiver is going to use a certain beamforming pattern on the data channel. This beamforming pattern advantageously comprises a main beam pointing toward the receiver. According to the invention, this beamforming pattern is also used on a signaling channel for transmitting the ANN. Thus, other neighboring nodes can use the ANN for estimating the expected interference that would also arise on the data channel if the prospective transmitter were to access the data channel.

According to some rule, which may be adjustable, each currently receiving neighboring node of the prospective transmitter checks whether or not it can allow for the additional interference. For instance, each neighboring node may compute the ratio of its currently received signal power $P_{DATA}$ and the sum of its currently received noise power $P_n$ and the expected additional interference power $P_{ANN}$. If this ratio still exceeds a threshold value $SNR_{threshold}$, the node can accept the announced transmission. This rule can be written as follows:

$$\frac{P_{data}}{P_n + P_{ANN}} \overset{?}{\geq} SNR_{threshold}$$

Otherwise, if a node cannot accept the transmission announced by an ANN, the node can object to the transmission or apply any other interference-reducing counter-measure.

Generally speaking, the invention can be applied to non-beamforming antennas as well. Moreover, more than one data channel may be used. Additionally, various modifications concerning the number and kind of messages and tones, their usage and used channels are possible. For instance, the announcement message may be sent twice in order to allow beamforming upon the first ANN and correct reception of the second ANN over an extended transmission range. For this purpose, the ANN may also be split into a signal that is not intended to convey data and also does not result in beamforming of other nodes and, if no OBJ occurred, a subsequent ANN signal containing the ID of the addressee.

In order to reduce the probability of fading, the outband signaling channel and the OBJ (and DFN) signals may span a considerable frequency band, as compared to the case when pure tones are used.

For deafness detection, two beamforming patterns may be used which both are not omni-directional.

In the following, the inventive protocol will be explained with respect to two examples.

The first example shows a successful channel access; the second example shows how a node prevents another node from transmitting. In both examples it is assumed that beamforming antennas are deployed. Each node i is capable of pointing a main lobe towards a second node j, resulting in an antenna gain pattern $P_{ij}$. An omni-directional antenna can be represented as a particular pattern $P_{ij}=P_{omni}$.

Figure 11A:
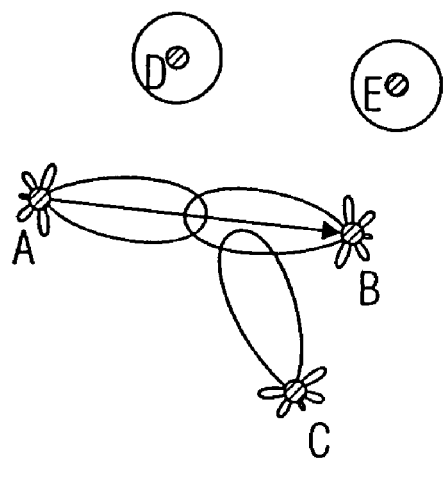
FIG. 11a is a successful channel access scenario.

FIG. 11(a) depicts a scenario where node A is transmitting data to node B, and node C intends to transmit to node D. Since the beamforming patterns drawn in the figures depict the linear antenna gain, the patterns do not necessarily have to overlap for successful transmission. Before node C is allowed to access the TCH, however, BeamMAC necessitates it to transmit an announcement message (ANN) on the $SCH_{IN}$, the AMM containing the identifier of the addressee (D). For transmitting the ANN, node C beamforms towards its intended receiver using pattern $P_{CD}$. If node C is not equipped with a beamforming antenna, it will transmit the ANN using the omni-directional pattern $P_{OMNI}$. Upon transmitting the ANN, node C listens on both the $SCH_{in}$ and $SCH_{OUT}$ using the same pattern $P_{CD}$ as used for the ANN. Since there is no problematic situation, a communication will finally take place.

Figure 11B:
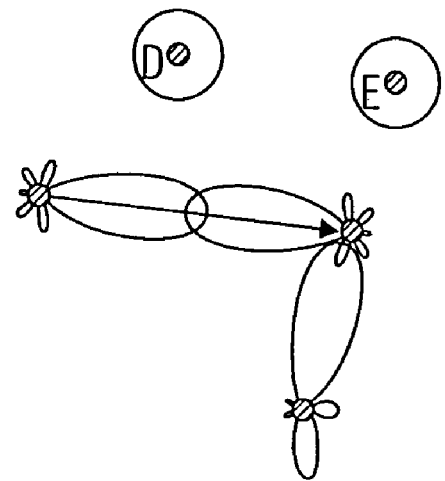
FIG. 11b is a successful collision avoidance scenario.
Figure 12:
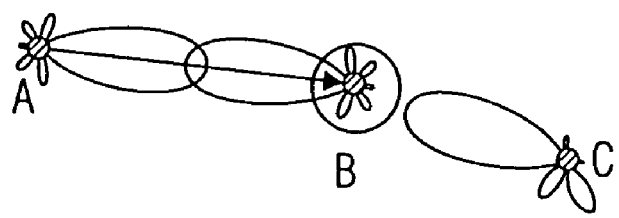
FIG. 12 is a successful deafness detection and resolution scenario.

In FIG. 11(b), node C intends to transmit to node E, and thus transmits an ANN using the antenna pattern $P_{CE}$ on the $SCH_{IN}$ and $SCH_{OUT}$. Node B is located in the main beam direction of node C and hence receives the ANN via one of its side lobes. Nevertheless, the data packed currently received by node B on the TCH is not corrupted, since the ANN is sent on the $SCH_{IN}$. However, if node C would proceed with data transmission to node E on the TCH, a collision or at least SIR degradation would occur. To avoid such high interference, node B objects to node C's transmission by sending an objection tone (OBJ) on the $SCH_{out}$ or applies another countermeasure. Node C detects the OBJ on the $SCH_{OUT}$ and enters a backoff state.

For the sake of an efficient interference estimation, it is advantageous that the ANN messages and data packets are transmitted with the same power. Consequently, $P_{ANN}$ can be used as an estimate for the interference power, which will add to the interference power level at the receiving node if no objection is sent. Since ANN messages are advantageously transmitted on $SCH_{IN}$, i.e. in the same frequency band as data packets, the channel fading for ANNs is substantially the same as for the intended data signal transmission.

In the following, the main features of the present invention are summarized referring to FIGS. 10a, 10b, 13 and 14a to 15.

Figure 10A:
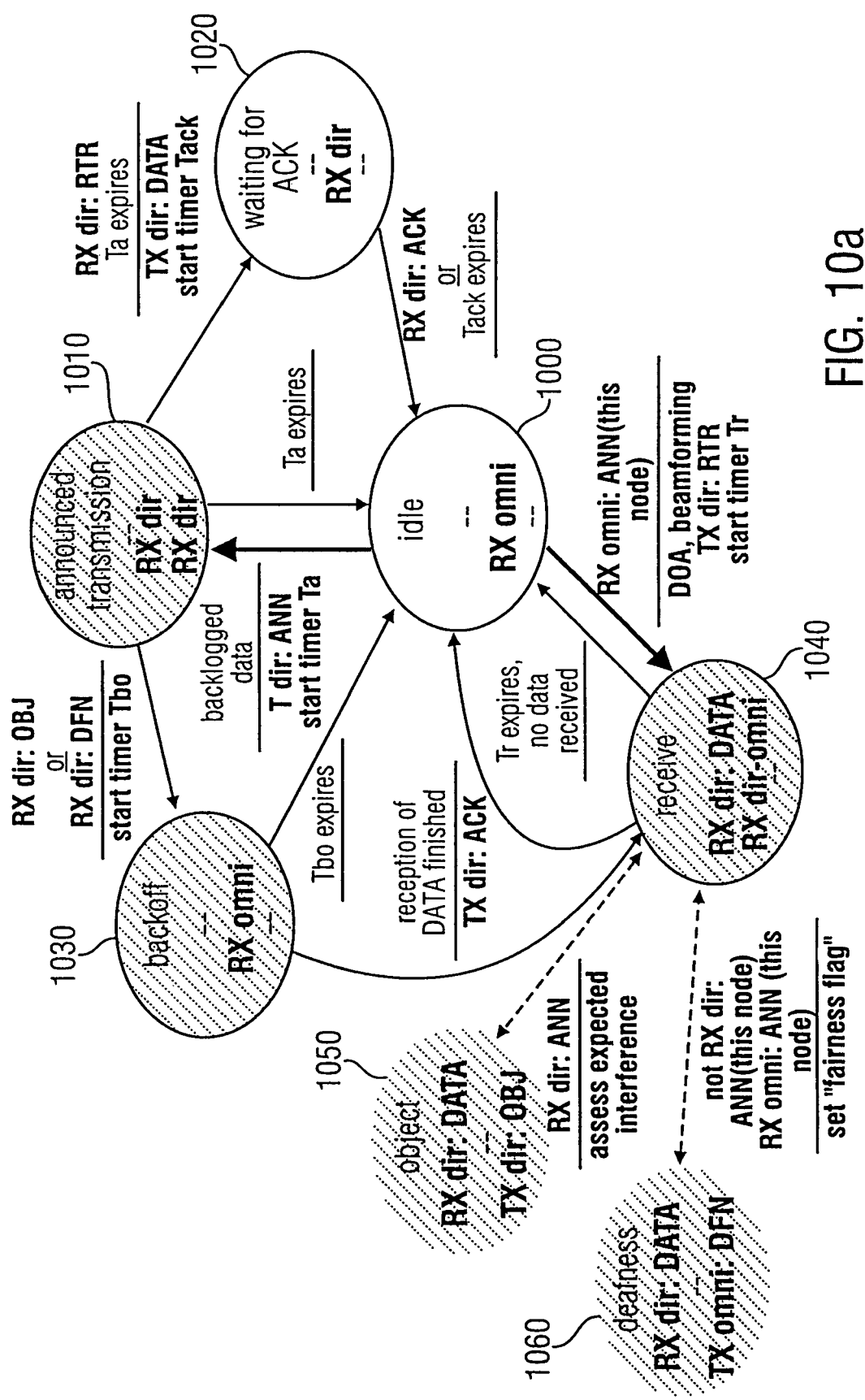
FIG. 10a is a state transition diagram in accordance with an embodiment of the present invention.

FIG. 10a shows a state transition diagram having several states, which can be taken by a communication node in the ad-hoc network. In general, each state has a circle having three lines. The upper line indicates the situation with respect to the traffic channel (TCH), the line in the middle indicates the situation with respect to the inband signaling channel (SCHin), while the bottom line indicates the situation with respect to the outband signaling channel (SCHout). This means that for example in state 1010 nothing happens on the TCH, while there is a directed receiving antenna setting on both signaling channels. With respect to the state transitions indicated by arrows between states, the text above the horizontal line indicates a certain event, while the text below the horizontal line indicates a reaction to this event.

A first state is an idle node 100, which has an omni-directional receiving antenna setting (RX omni). Then, node 100 wants to communicate to a receiver. To this end, the transmitter starts its timer Ta and beamforms its transmission antenna to a directional transmission antenna setting (TXdir). Then, the announcement signal ANN is transmitted. Now, the receiver is in another state, i.e., in the state where a transmission has been announced, which is indicated in FIG. 10a by 1010. Falling back from the state 1010 to the state 1000 takes place, when the timer Ta expires, i.e., when no ready-to-receive signal has been received. When, however, a ready-to-receive signal is received, an objection is not detected, and the timer Ta has expired, the transmitter starts transmitting data on the traffic channel with its transmission antenna in a directional setting. Additionally, another timer Tack is started. When the transmitter has transmitted its data, it falls into state 1020, where it is waiting for an acknowledgement signal, which confirms complete and successful receipt of all data by the addressed receiver. As soon as this acknowledgement signal has been received or, as soon as the timer Tack has expired, a state transition from state 1020 back to state 1000 takes place.

When the transmitter is, however, in state 1010 and receives an objection signal from another non-addressed receiver or a deafness tone from the addressed receiver, the communication node falls into state 1030, which is called the back-off state in FIG. 10a. In this state, the transmitter waits until expiry of back-off timer Tbo to again come into the idle state 1000 for retrying to come in contact to the desired receiver. In an embodiment, the receiver antenna is set to an omnidirectional receiving state so that the node in state 1030 can listen for an announcement signal identifying the node in state 1030. Thus, the node in state 1030 can receive information from a further transmitter (indicated by the arrow from state 1030 to state 1040 which is identical to the fat arrow between state 1000 and state 1040) while being in the back-off state, in which this node waits until this node can send.

Figure 13:
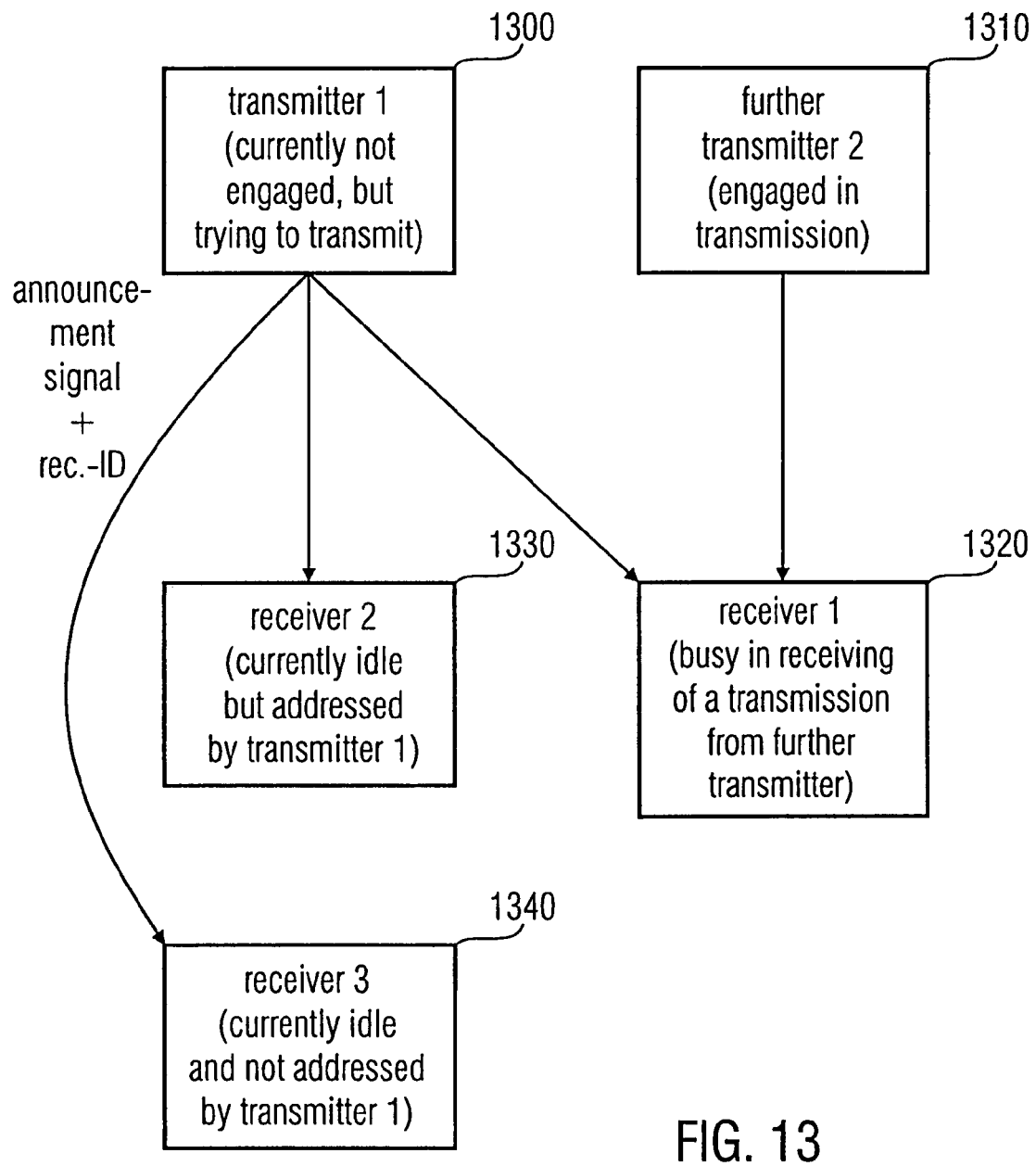
FIG. 13 is a schematic overview over certain transmitter and receiver states/situations.

States 1000, 1010, 1020 and 1030 correspond to the "transmitter nature" of a communication node, which nature is also indicated in FIG. 13 by blocks 1300 and 1310. Additionally, reference is made to FIG. 15, where a flow chart of a main functionality of the inventive receiver is shown. The step of sending an announcement signal on the signaling channel in (SCHin) 1500 takes place, when the transmitter is going from state 1000 to state 1010. Then, the receiver listens for a ready-to-receive signal on the signaling channel from an identified receiver (step 1510). Additionally, the receiver listens for an objection tone for a pre-determined period, which is equal to the timer Ta in FIG. 10a. Additionally, as a countermeasure, there could be the case that the transmitter has to negotiate with an (possibly) objection receiver (step 1520). When no objection is received, and when a ready-to-receive signal is received, the transmitter jumps from a state 1010 to state 1020, after data transmission via the traffic channel has been started and completed (step 1530).

A communicating node jumps from state 1000 to state 1040, when this node scans for an announcement signal identifying this node. Then, a direction of arrival (DOA) is detected, and a subsequent beamforming is performed, and, with a directional transmission antenna pattern, the ready-to-receive signal is transmitted. Additionally, a timer Tr is started. A simple fallback from state 1040 to state 1000 takes place, when the timer Tr expires and no data are received. Alternatively, the receiver being in state 1040 now receives data from the transmitter, which forwarded the announcement signal. After the reception of data is finished, the receiver in state 1040 sends an acknowledgement signal (ACK) with its directional transmission antenna and jumps back into the idle state 1000.

State 1050 indicates a receiver, which is not-addressed, but which is currently active in receiving data via the traffic channel. Such a receiver receives the announcement signal by scanning the dedicated signaling channel and assesses the expected interference to find out, whether the interference caused by the new transmitter transmitting on the traffic channel is allowable or not. When it is not allowable, it takes a counter-measure, which can be a hard measure such as issuing an objection tone, or which can be a "soft" measure such as applying a multi-user scheme, a beamforming procedure for nulling-out the interfering transmitter or an explicit negotiation with the upcoming transmitter for reducing transmission power or the already existing transmitter for enhancing transmission power or enhancing redundancy included in the received data. This can be done by an decreased code rate used by an error correction encoder being positioned in the actually transmitting transmitter.

Alternatively, a communication node, when being identified by an announcement signal, can be in a deafness state. The deafness state is detected by changing between an omni-directional or a directional antenna characteristic. When the deafness situation is detected, the receiver, naturally, continues to receive data via the traffic channel from its already existing "transmitter partner", but issues a deafness tone. Additionally, as indicated in FIG. 10a, the receiver being in state 1060 sets a "fairness flag" for the transmitter which tried to reach him in order to perform any fairness measure after transmission with its transmission partner is finished. One possibility would be to perform a beamforming action into the direction of the transmitter trying to reach the receiver. Another possibility would be to reject any other requests to come in contact to the receiver for a certain period in order to give the deafness-rejected transmitter a fair chance of coming in contact to the receiver.

FIG. 10b shows an overview over channels, messages and tones.

In the following, FIG. 13 will be discussed. With respect to the state diagram in FIG. 10a, receiver 1 corresponds to state 1040, i.e., a receiver being busy in communication with a transmitter such as the further transmitter 1310 without any problems related to deafness or interference. Receiver 2 in FIG. 13 shown in block 1330 corresponds to another receiver in state 1040 which is currently idle but addressed by a transmitter and which might encounter problems with at least deafness. Finally, receiver 3 shown in block 1340 in FIG. 13 indicates a currently idle and not-addressed receiver such as a node in state 1000 of FIG. 10a.

Figure 14A:
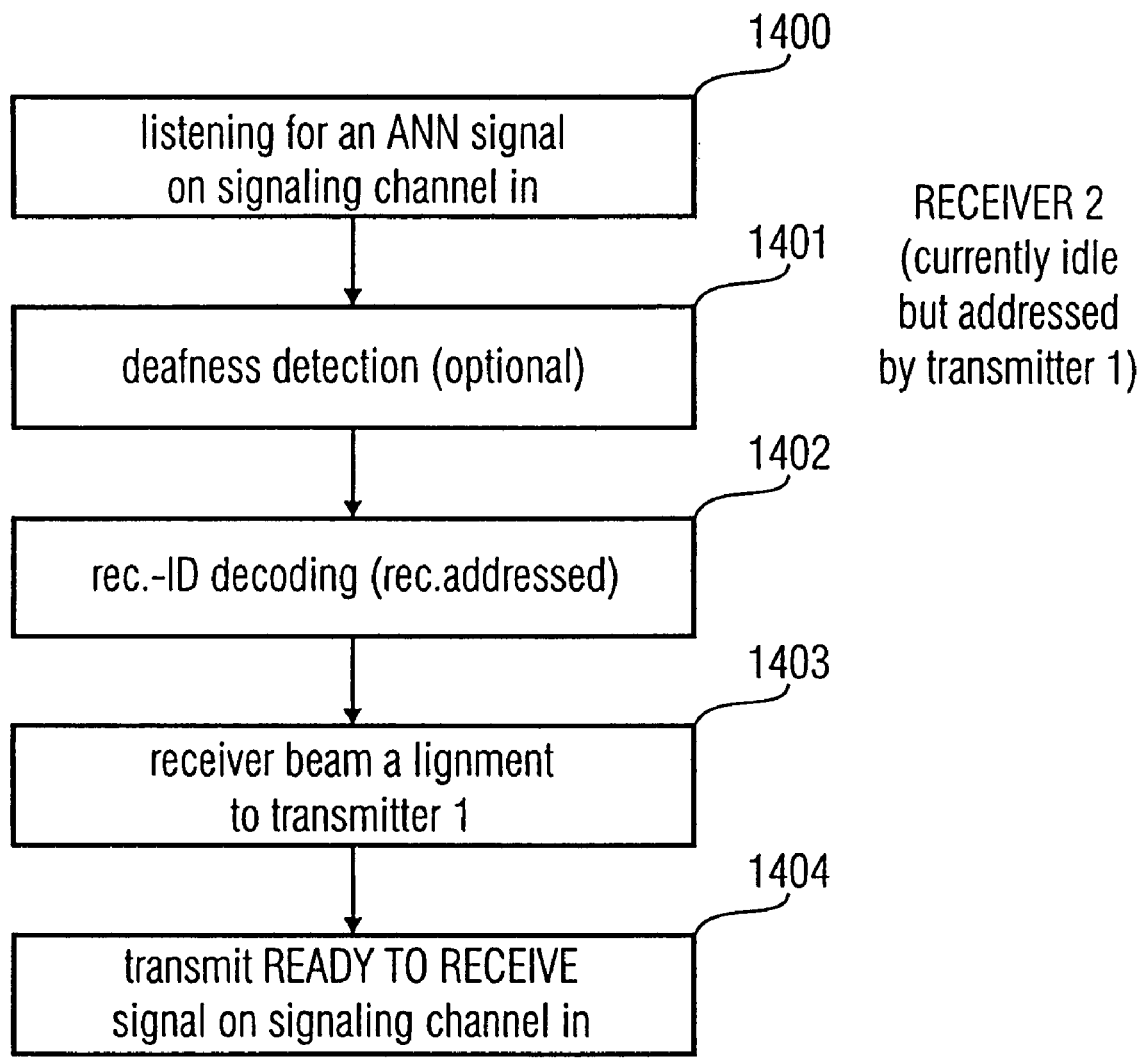
FIG. 14a is a flow chart of steps performed by a receiver currently idle but addressed by a transmitter.

FIG. 14a shows a sequence of steps that can be performed by receiver 2, which is currently idle but addressed by a transmitter. In step 1400, the receiver is listening for an announcement signal.

Generally, a deafness detection can optionally be performed in step 1401 before detecting the announcement signal. However, it is to be noted here that detecting the announcement signal using the directional antenna setting automatically precludes a deafness situation.

In a deafness situation, the announcement message can only be detected using the omni-directional receiving antenna setting. When an announcement signal is received in step 1400 and when no deafness situation is encountered in step 1401, a receiver-ID decoding step 1402 is performed.

When, however, a deafness situation is detected (ANN is received omni-directionally only), the ANN signal is also decoded to find out, whether the deaf receiver is the intended addressee. Only when the deaf receiver is the addressee of the ANN signal, an (anonymous deafness tone) is issued using the omni-directional antenna setting.

When the non-deaf receiver determines that the new transmitter wants to communicate with the receiver, a receiver beam alignment to transmitter 1 is performed in step 1403. Finally, a ready-to-receive signal is transmitted in step 1404. After step 1404, the receiver is in state 1040, provided that no other receiver has issued an objection tone.

Figure 14B:
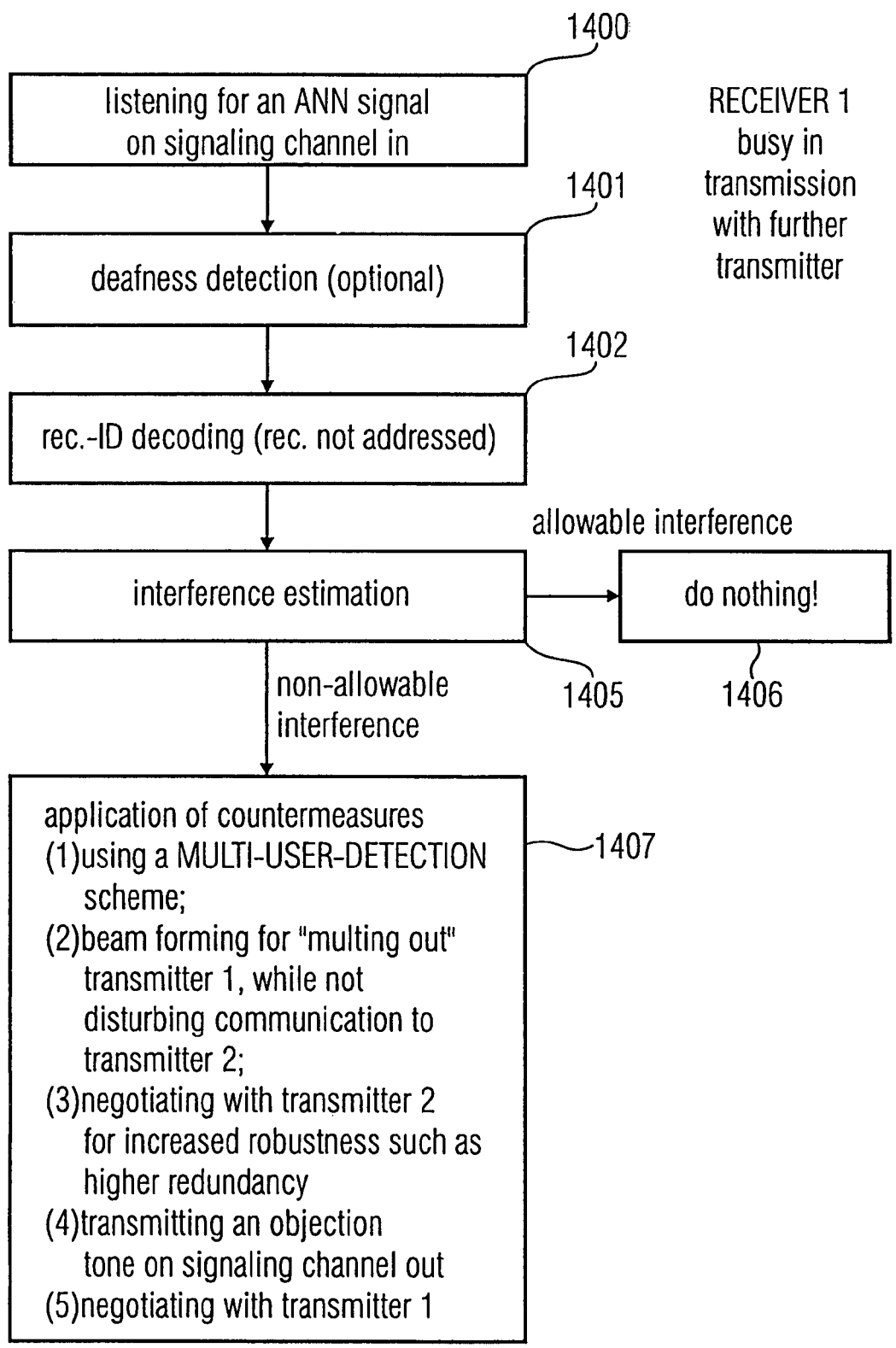
FIG. 14b is a flow chart of steps performed by a receiver which is busy in transmission with a further transmitter, and which is not addressed by an announcement signal.

FIG. 14b shows the situation of a receiver, which is busy in transmission with a further receiver and is not identified by the announcement signal. In this case, an interference estimation step 1405 has to be performed. When only an allowable interference is estimated, the receiver shown in FIG. 14b will do nothing more (block 1406). When, however, an non-allowable interference is encountered, an interference counter-measure is applied in step 1407. The "hardest" counter-measure is counter-measure (4) in block 147, i.e., issuing an objection tone as shown in state 1050 FIG. 10a. Other more moderate counter-measures can be the implementation of a multi-user detection scheme based on the receiver ID of this receiver or based on information on the transmitter, which is already communicating with this receiver. Thus, the allowable interference threshold can—hopefully—be raised so that, possibly, the new transmitter remains below this threshold.

Another alternative for manipulating this threshold is, when the receiver performs a beamforming procedure for "nulling-out" the new transmitter. Here, the allowable interference threshold stays the same but the allowable interfering power of the new transmitter is raised. However, this step has to be performed such that the communication to the already existing transmitter is not disturbed. Naturally, the beamforming can result in a reduced signal-to-noise ratio between the receiver and the currently transmitting transmitter. This, however, is not problematic, when the reduced signal-to-noise ratio is still above an allowable signal-to-noise ratio.

An alternative counter-measure is, when the receiver starts a negotiation with the new transmitter to reduce its transmission power or a negotiation with the currently communicating transmitter to make sure that more redundancy is included into the transmitted data. Several possibilities are possible in this connection. Nevertheless, it is to be noted here that any negotiation will result in a more complicated protocol. Therefore, "receiver-only" measures are advantageous with respect to measures necessitating a communication between the receiver and one of the two "competing" transmitters.

Figure 14C:
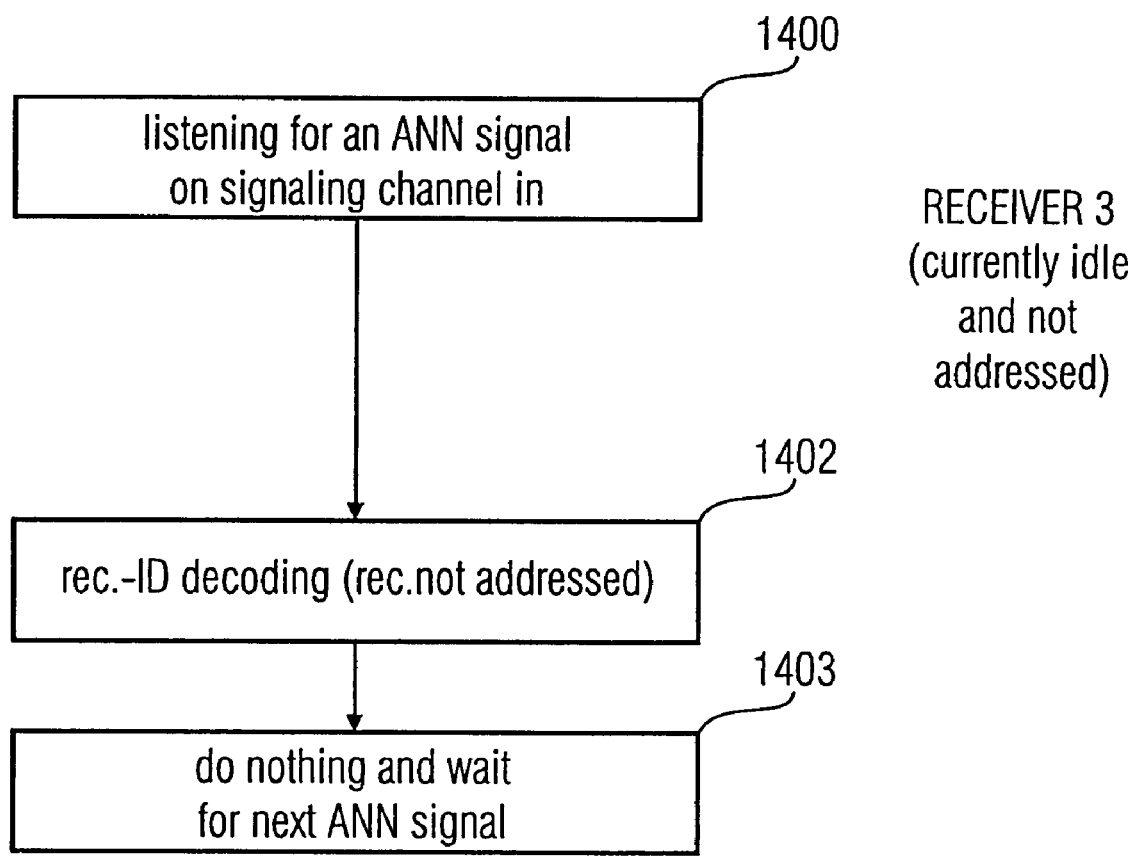
FIG. 14c is a flow chart of steps performed by a receiver which is currently idle and not addressed.
Figure 15:
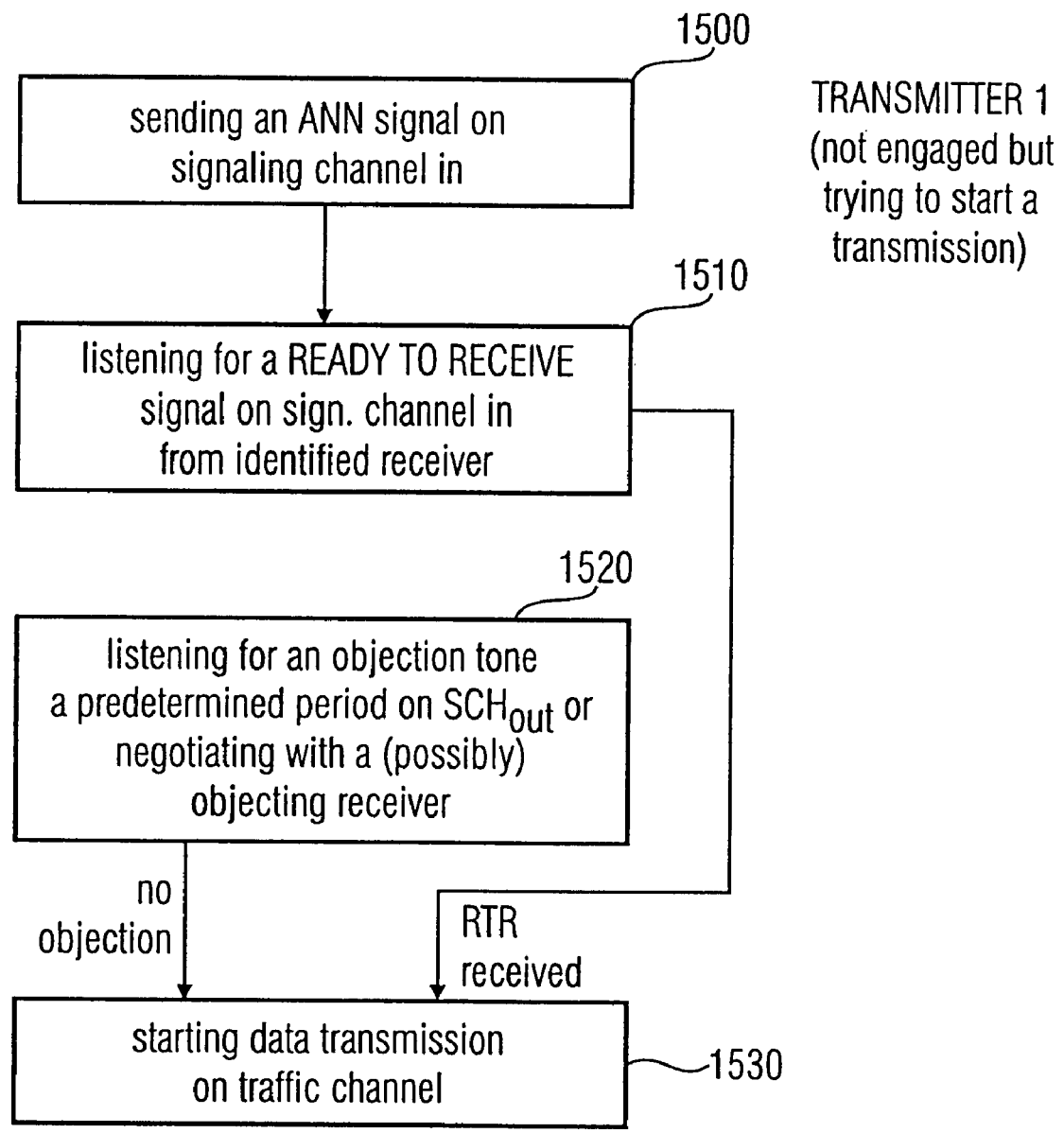
FIG. 15 is a flow chart of steps performed by a transmitter, which is currently not engaged in a transmission but tries to start a transmission.

FIG. 14c indicates another receiver situation, i.e., a currently idle and not-addressed receiver. This receiver corresponds to state 1000 in FIG. 10a. the receiver continuously listens for an announcement signal. When an announcement signal is received, the receiver decodes the included receiver-ID. When the receiver is not addressed, nothing further will be done. The receiver only starts waiting for a next announcement signal occurring on the dedicated signaling channel.

Depending on certain implementation requirements of the inventive methods, the inventive methods can be implemented in hardware or in software. The implementation can be performed using a digital storage medium, in particular a disk or a CD having electronically readable control signals stored thereon, which cooperate with a programmable computer system such that the inventive methods are performed. Generally, the present invention is, therefore, a computer program product with a program code stored on a machine readable carrier, the program code being operative for performing the inventive methods when the computer program product runs on a computer. In other words, the inventive methods are, therefore, a computer program having a program code for performing at least one of the inventive methods when the computer program runs on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A receiver for a network comprising a non-centralized medium access control, comprising:
   a receiving unit for scanning a dedicated signaling channel for the presence of an announcement signal, the announcement signal indicating a transmitter willing to access the transmission medium, and for receiving a data signal from a further transmitter on a dedicated traffic channel;
   an interference estimator for estimating, whether an interference on the traffic channel caused by a potential medium access of the transmitter transmitting the announcement signal is allowable or not; and
   a processor for applying an interference counter-measure, when the interference is not allowable.

2. The receiver in accordance with claim 1, in which the dedicated signaling channel and the traffic channel are selected such that a channel characteristic of the traffic channel depends on a channel characteristic of the signaling channel, and
   wherein the interference estimator is operative to estimate the interference based on the announcement signal scanned by the receiving unit.

3. The receiver in accordance with claim 1, in which the traffic channel occupies a frequency band of the transmission medium and the signaling channel occupies at least a part of the same frequency band of the transmission medium, the announcement signal being encoded using an encoding scheme to enable extracting the announcement signal from a superposition of the data signal and the announcement signal,
   wherein the receiving unit is operative to receive a channel signal in the frequency band, to extract a signal portion from the channel signal using information on the encoding scheme, and to detect the announcement signal in the signal portion.

4. The receiver in accordance with claim 3, in which the encoding scheme is a multiple access encoding scheme reserved for encoding announcement signals, and wherein the receiving unit is adapted for extracting the signal portion by applying an inverse multiple access scheme to the channel signal.

5. The receiver in accordance with claim 4, in which the multiple access scheme is a CDMA scheme or an IDMA scheme.

6. The receiver in accordance with claim 1, wherein the receiving unit is adapted for performing a reception beam pattern comprising a main reception lobe directed to the further transmitter.

7. The receiver in accordance with claim 1, in which the interference estimator is operative to only be active, when an identifier included in the announcement signal does not identify the receiver.

8. The receiver in accordance with claim 1, in which the processor is operative to cause, as a counter-measure, a transmission of an objection tone by the receiver for informing the transmitter that the transmission is not allowed.

9. The receiver in accordance with claim 1, in which the processor is operative, as a counter-measure, to detect a direction of incidence of the announcement signal and to control the receiving unit for reducing a receiving antenna gain in the direction of incidence.

10. The receiver in accordance with claim 1, in which the processor is operative to apply, as a counter-measure, a multi-user detection scheme or an interference cancellation scheme based on a known characteristic of the transmitter, the further transmitter or the receiver.

11. The receiver in accordance with claim 1, in which the processor is operative to apply, as a counter-measure, a negotiation with the further transmitter for improved transmission robustness including a higher transmission power or a higher data redundancy.

12. The receiver in accordance with claim 1, in which the processor is operative to apply, as a counter-measure, a negotiation with the transmitter sending the announcement signal for less transmission power.

13. The receiver in accordance with claim 1, in which the interference estimator is operative to determine a power or an energy of the announcement signal and a power or an energy of the data signal and to estimate, whether the interference is allowable or not based on a relation between the determined values.

14. The receiver in accordance with claim 1, in which the interference estimator is operative to evaluate the following equation:

$$\frac{P_{data}}{P_n + P_{ANN}} \overset{?}{\geq} SINR_0,$$

wherein $P_{data}$ is the currently received data signal power over the traffic channel,
$P_n$ is the noise power,
$P_{ANN}$ is the received power of the announcement signal in the dedicated signaling channel, and
$SINR_0$ is the minimum SINR that is to be assured so that the interference is allowable.

15. The receiver in accordance with claim 1, in which the processor is operative to transmit, as a counter-measure, an objection signal, the objection signal being transmitted within a further signaling channel, which is different from the traffic channel.

16. The receiver in accordance with claim 15, in which the further signaling channel is an out-of-band channel.

17. The receiver in accordance with claim 1, further comprising:
   an identification detector for indicating that the receiver is identified by the transmitter, and
   wherein the processor is further operative to cause a transmission of a ready-to-receive signal, when the receiver is not receiving data from the further transmitter via the traffic channel.

18. The receiver in accordance with claim 17, in which the receiver is operative to detect a direction of incidence of a signal from the transmitter and to control the receiving unit to increase a receiving antenna gain in the detected direction of incidence.

19. The receiver in accordance with claim 1, wherein the receiving unit is adapted for applying a direction-dependent reception characteristic for receiving the channel signal and for applying a further reception characteristic for receiving a further channel signal for deafness detection.

20. The receiver in accordance with claim 19, wherein the receiving unit is adapted for applying the direction-dependent reception characteristic during a time interval, and for applying the further reception characteristic during another time interval.

21. The receiver in accordance with claim 19, further comprising a transmission unit adapted for transmitting the deafness signal for the communication network within a further dedicated signaling channel, in order to indicate that the receiver is not capable of capturing a signal from a direction of arrival associated with the transmitter when applying the direction-dependent reception characteristic directed to the further transmitter.

22. The receiver in accordance with claim 19, in which the receiver is operative to detect a deafness situation only when the receiver is identified as a receiver addressed by the transmitter.

23. A transmitter for a network comprising a non-centralized medium access control, comprising:
a transmitting unit for transmitting an announcement signal on a dedicated signaling channel, the announcement signal indicating that the transmitter is willing to access the transmission medium and to communicate with an addressed receiver;
a receiving unit for listening for an objection signal from a non-addressed receiver; and
a processor for controlling the transmission unit to start transmitting a data signal on a dedicated data channel only when no objection signal has been received.

24. The transmitter in accordance with claim 23,
in which the receiving unit is operative to listen to a ready-to-receive signal from the addressed receiver, and
in which the processor is further operative to control the transmission unit to start transmitting a data signal on a dedicated data channel only when a ready-to receive signal from the addressed receiver has been received and no objection signal has been received.

25. The transmitter in accordance with claim 24, in which the transmitting unit is adapted for transmitting the announcement signal using the same beamforming pattern, which is to be used when transmitting the data signal.

26. The transmitter in accordance with claim 23, in which the receiving unit is adapted to receive the ready-to-receive signal in the same signaling channel as the announcement signal has been transmitted and to receive an objection signal in a different signaling channel.

27. The transmitter in accordance with claim 23, in which the receiving unit is operative to receive the objection signal in a frequency band, which is not covered by the traffic channel.

28. The transmitter in accordance with claim 23, in which the processor is operative to control the transmission unit to start transmission, when no objection signal within a predetermined time period has been received.

29. A method of receiving in a network comprising a non-centralized medium access control, comprising:
scanning a dedicated signaling channel for the presence of an announcement signal, the announcement signal indicating a transmitter willing to access the transmission medium,
receiving a data signal from a further transmitter on a dedicated traffic channel;
estimating, whether an interference on the traffic channel caused by a potential medium access of the transmitter transmitting the announcement signal is allowable or not; and
applying an interference counter-measure, when the interference is not allowable.

30. A method of transmitting in a network comprising a non-centralized medium access control, comprising:
transmitting an announcement signal on a dedicated signaling channel, the announcement signal indicating that the transmitter is willing to access the transmission medium and to communicate with an addressed receiver;
listening for an objection signal from a non-addressed receiver; and
starting a transmission of a data signal on a dedicated data channel only when no objection signal has been received.

31. A computer program for performing, when the program runs on a computer, a method of receiving in a network comprising a non-centralized medium access control, comprising:
scanning a dedicated signaling channel for the presence of an announcement signal, the announcement signal indicating a transmitter willing to access the transmission medium,
receiving a data signal from a further transmitter on a dedicated traffic channel;
estimating, whether an interference on the traffic channel caused by a potential medium access of the transmitter transmitting the announcement signal is allowable or not; and
applying an interference counter-measure, when the interference is not allowable.

32. A computer program for performing, when the program runs on a computer, a method of transmitting in a network comprising a non-centralized medium access control, comprising:
transmitting an announcement signal on a dedicated signaling channel, the announcement signal indicating that the transmitter is willing to access the transmission medium and to communicate with an addressed receiver;
listening for an objection signal from a non-addressed receiver; and
starting a transmission of a data signal on a dedicated data channel only when no objection signal has been received.

* * * * *